Nov. 4, 1941.  O. NEUBERT, JR  2,261,444
FOLLOW-UP VALVE
Filed Dec. 20, 1938  3 Sheets—Sheet 1
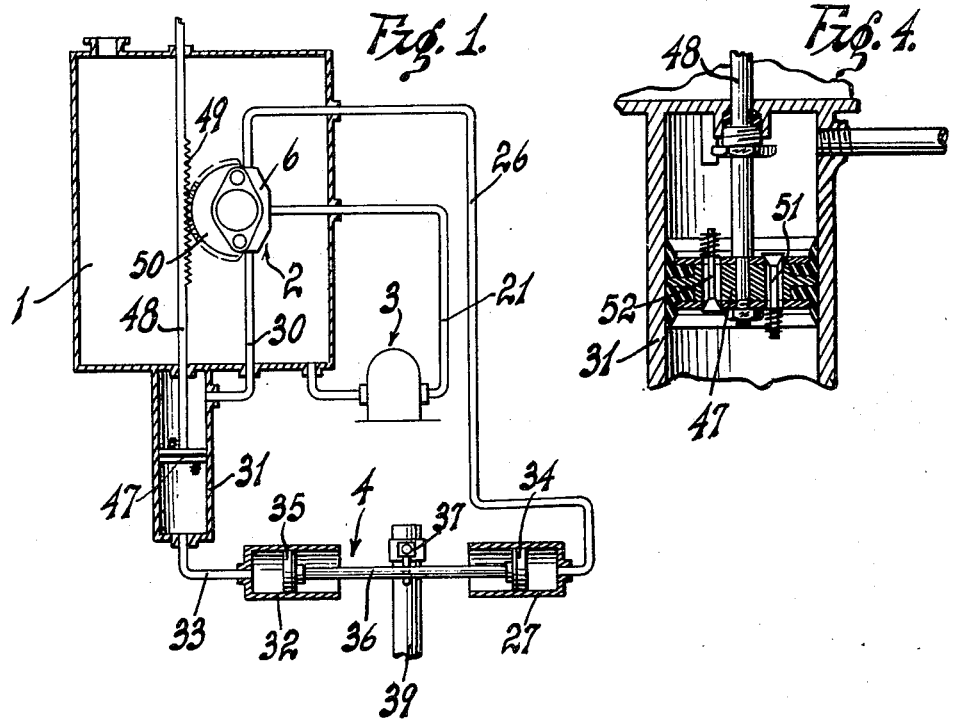
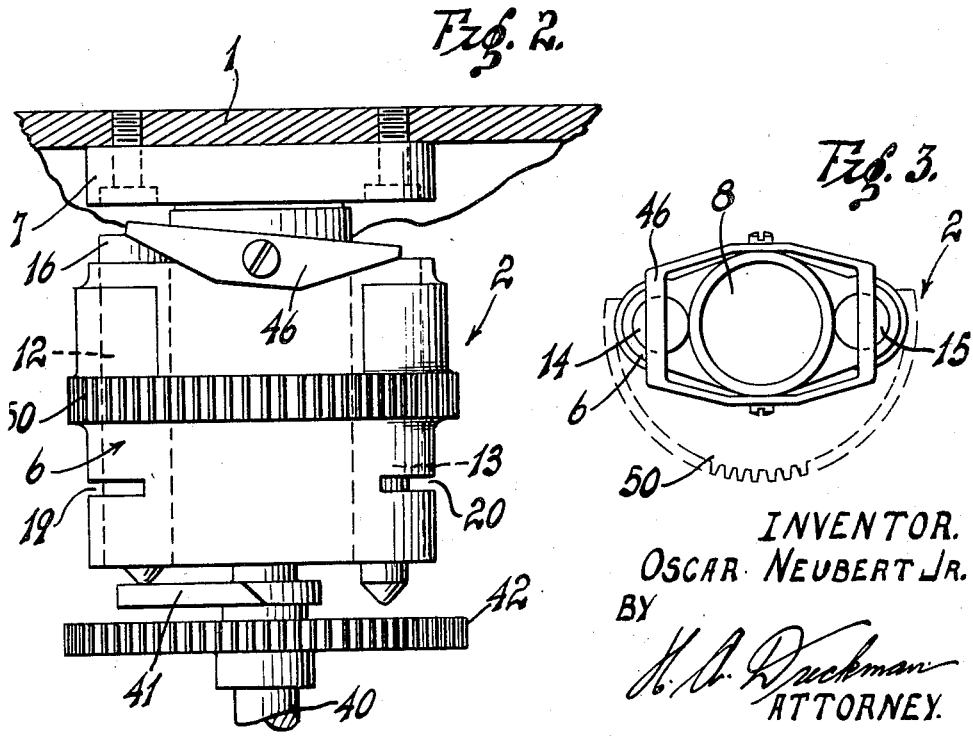
INVENTOR.
OSCAR NEUBERT JR.
BY
H. A. Duckman
ATTORNEY.

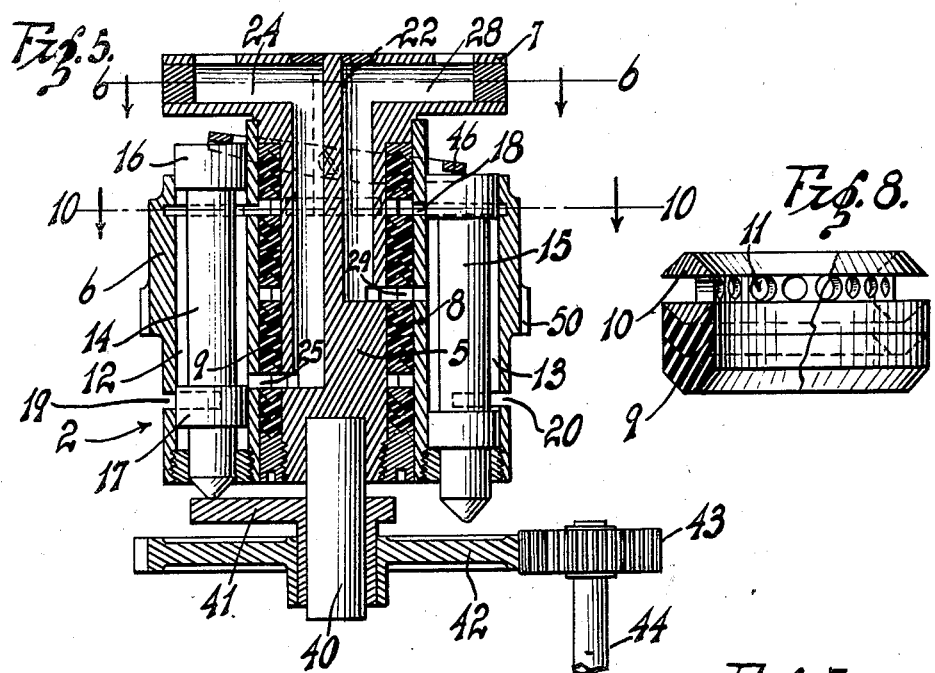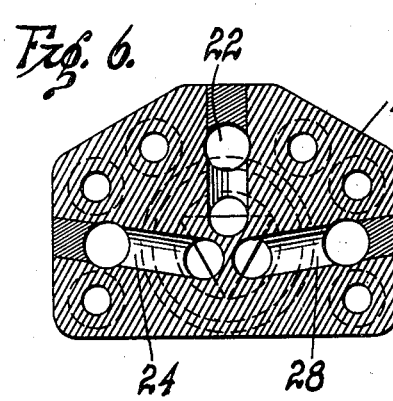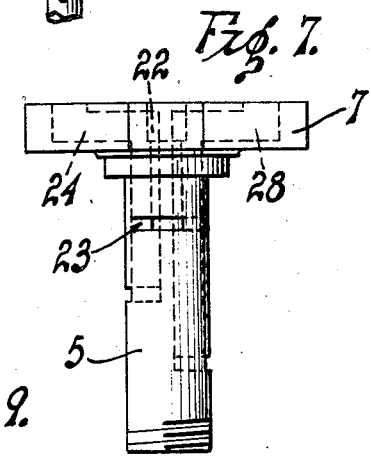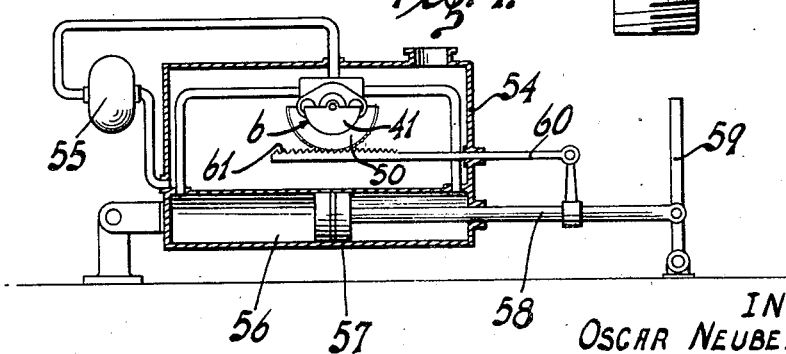
INVENTOR.
OSCAR NEUBERT JR.
BY
ATTORNEY.

Nov. 4, 1941.   O. NEUBERT, JR   2,261,444
FOLLOW-UP VALVE
Filed Dec. 20, 1938   3 Sheets-Sheet 3
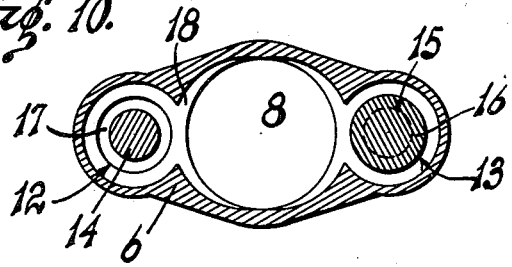
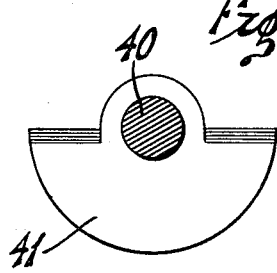
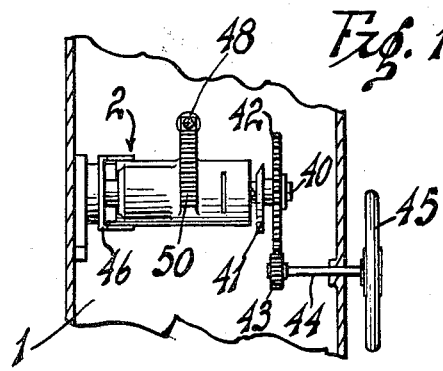
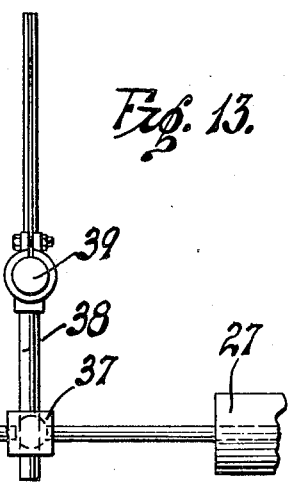
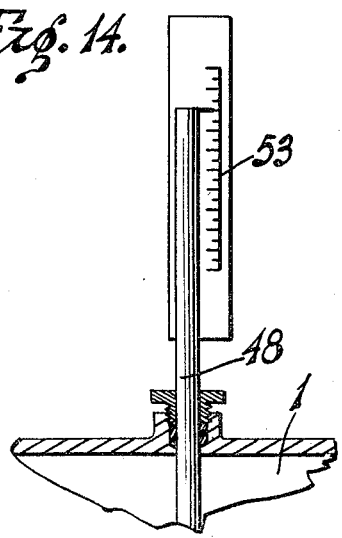
INVENTOR.
OSCAR NEUBERT JR.
BY
*H. A. Druckman*
ATTORNEY.

Patented Nov. 4, 1941

2,261,444

UNITED STATES PATENT OFFICE 2,261,444

FOLLOW-UP VALVE

Oscar Neubert, Jr., Long Beach, Calif.

Application December 20, 1938, Serial No. 246,842

5 Claims. (Cl. 121—41)

This invention relates to a hydraulic remote control, particularly useful in controlling the position of a ship's rudder or the like, and to control the movement of operating levers for machines, clutches, and the like.

An object of my invention is to provide a simple and effective remote control actuated by a wheel or lever, the remotely positioned rudder, or the like, automatically following the movement of the manually operable wheel or lever.

A feature of my invention resides in the novel means of actuating a remote rudder, or the like, said rudder following and stopping at the position indicated by the manually controlled wheel or lever. The rudder, or the like, also closely follows the movement of the manually rotated wheel or lever.

A further object of my invention is to provide a novel hydraulic remote control, in which there is no back pressure against the manually actuated wheel or lever by reason of any force exerted against the rudder, or the like.

Another feature of my invention is that when the manually controlled wheel or the lever is stationary, the rudder, or the like, is firmly held in a set position.

An advantage of my hydraulic remote control is that the rudder, or the like, can be quickly and positively moved, as desired, thereby enabling the ship to be easily maneuvered.

Another object of my invention is to provide a novel hydraulic remote control in which the force necessary to move the rudder, or the like, is created by a hydraulic power-driven pump, the said pump being under load only when the rudder, or the like, is being moved.

A further object of my invention is to provide a novel hydraulic control, which is simple in construction, inexpensive to manufacture, which requires little repair, and in which the moving parts are immersed in oil.

Other objects, advantages and features of invention may appear from the accompanying drawings, the subjoined detailed description, and the appended claims.

In the drawings:

Figure 1 is a diagrammatic, vertical, sectional view of my hydraulic remote control.

Figure 2 is a side elevation of a control valve.

Figure 3 is a top plan view of the control valve with the inner plug removed.

Figure 4 is a fragmentary, longitudinal, sectional view of the valve control cylinder.

Figure 5 is a longitudinal, sectional view of the control valve.

Figure 6 is a sectional view taken on line 6—6 of Figure 5.

Figure 7 is a side elevation of the valve plug.

Figure 8 is a side elevation with parts broken away of one of the packing rings.

Figure 9 is a horizontal, sectional view, showing a modified arrangement of the remote control.

Figure 10 is a sectional view taken on line 10—10 of Figure 5.

Figure 11 is a plan view of the valve controlling cam.

Figure 12 is a fragmentary, horizontal, sectional view of the reservoir tank, with the control valve mounted therein.

Figure 13 is a plan view of the rudder control ram attached to the rudder post.

Figure 14 is a fragmentary, horizontal, sectional view of the reservoir tank, showing the rudder position indicator.

Referring more particularly to the drawings, my hydraulic remote control consists essentially of a reservoir or supply tank 1, a valve body 2, a pump 3, and an actuating ram 4. In order to simplify the construction of my device, I prefer to mount the valve 2 within the tank 1, thus eliminating various pipe lines. However, the device will work equally well if it is inside or outside of the reservoir tank.

The control valve 2 comprises a plug 5, which extends into the body 6 of the valve. The plug 5 is formed with a flange 7 at one end thereof for the purpose of bolting the plug to the wall of the supply tank, and thereby supporting the valve body within the tank. The plug is thus held stationary and the valve body rotates on the plug, as will be further described.

The plug 5 is spaced from the wall of the bore 8 in the valve body, and this space is filled with packing 9, which prevents leakage between the various ports, which will be subsequently described. To permit fluid to pass through the packing 9, I provide annular rings 10 in the packing, and these rings have a plurality of holes 11 therein, through which fluid passes in the operation of the device. The rings 11 are spaced over the ports, as shown in Figure 5, and the fibrous packing on either side of these rings will prevent the fluid from leaking around the valve plug 5.

The valve body 6 is provided with two valve chambers 12 and 13, positioned one on each side of the valve body. A slide valve 14 and 15 is mounted in the chambers 12 and 13 respectively. These slide valves are identical in construction, and each is provided with enlarged rings 16 and 17, which closely fit the chambers 12 or 13. Between these rings, the valve is reduced in diameter to provide a passage for the fluid, which moves in the hydraulic valve control. The valve body is provided with an intake port 18 adjacent the upper end thereof, and this port opens into both the chambers 12 and 13 from the central bore 8. The valve body is also provided with outlet ports 19 and 20 from the chambers 12 and 13, respectively. These outlet ports are provided adjacent the lower ends of the chambers, and are controlled by the lower valve collar or flange 17. The intake ports are controlled by the upper flange or collar 16.

The pump 3 is of usual and well-known design and this pump picks up fluid from the supply tank 1, and forces this fluid under pressure through the pipe 21 and thence into the duct 22 in the valve plug 5. The duct 22 terminates in a horizontal cut in the plug, shown at 23, and this cut coincides with the port 18, permitting the incoming fluid under pressure to pass into either of the chambers 12 or 13, depending upon the position of the valves 14 and 15.

One outlet duct 24 is provided in the plug 5, and this duct communicates with a port 25, which opens into the chamber 12 adjacent the lower end of said chamber. A pipe 26 extends from the duct 25 to one cylinder 27 of the ram 4. A second outlet duct 28 communicates with a port 29 in the body of the valve, and this port communicates with the valve chamber 13. A pipe 30 extends from the duct 28 to the upper end of a control cylinder 31. The other end of the control cylinder is connected to the cylinder 32 of the ram 4 through the pipe 33. The ram cylinders 27 and 32 each include a piston 34 and 35, which pistons are connected by the rod 36. A block 37 on the rod 36 slidably receives the post 38, which is clamped to the rudder post 39. Thus, the movement of the pistons 34 and 35 in either direction will move the rudder from side to side. It is obvious that, while I have illustrated a rudder, other structures and devices can be controlled equally well from or by means of the rod 36.

A trunnion 40 projects from the lower end of the plug 5 and a cam 41 is journaled on this trunnion. A gear 42 is fixedly attached or integrally formed with the cam 41. A pinion 43 on the shaft 44 meshes with the gear 42. The shaft 44 extends out of the supply tank 1, and a wheel or the like 45 is attached to the shaft for the purpose of rotating the same. The cam 41 is approximately semi-circular in shape and is adapted to be moved under either one of the valves 14 or 15. When the cam 41 engages either of these valves, the valve is lifted as shown in Figure 5, thus opening the intake port to that particular valve and closing the outlet port from the valve. The port to the ducts 24 or 28 will open and when fluid under pressure is forced into either valve this fluid under pressure will pass into either of the ducts 24 or 28, thus exerting pressure against the pistons in the cylinders 27 or 32, thereby causing these pistons to move to one side or the other, and move the rudder post 39, or the like.

A yoke 46 is pivotally mounted on the valve body 6 and engages the upper end of the slide valves 14 and 15. Thus, when one of these valves is raised, the other valve will be forced downwardly through the action of the pivoted yoke 46. With this arrangement, the intake port 18 can be open to only one valve chamber at a time.

The control cylinder 31 is provided with a reciprocally mounted piston 47 and a piston rod 48, which extends upwardly into the reservoir or tank 1. A rack 49 is formed on the piston rod 48 and this rack meshes with an arcuate gear 50, on the exterior of the valve body 6. When the piston 47 moves in the cylinder 31 the rack 49 will rotate the valve body 6, thus causing a follow-up movement, which will limit the time during which either of the valves 14 or 15 will open, and will enable the operator to determine the throw of the rudder by the amount of movement of the wheel 45 and the corresponding movement of the cam 41. In event of extreme movement of the piston 47, it is desirable to permit fluid to pass through this piston, therefore I arrange oppositely positioned valves 51 and 52 in the piston, which are normally spring closed. The stem of these valves engaging either the upper or lower ends of the cylinder 31 will cause the valve to open, thus allowing fluid to by-pass the piston 47. Since the movement of the piston rod 48 is commensurate with the movement of the rudder, a gage 53 at the upper end of the rod will enable the operator to visually determine the position of the rudder.

In Figure 9, the same valve body 6 is mounted within a tank 54, which contains fluid. A pressure pump 55 supplies fluid from this tank to the valve in the same manner as previously described. The ram 56 is provided with a single piston 57, which receives fluid under pressure on both sides, depending on the control of the valve 6, in the manner previously stated. The piston rod 58 is connected to a lever or other device to be controlled 59. The follow-up control of the valve is accomplished through the rod 60, which is attached to the piston rod 58. The rod 60 is provided with a rack 61, which engages the arcuate gear 50 on the valve body. The cam 41 is adjusted to engage either of the valves 14 and 15 by means of a manually rotated lever, or the like, in the same manner as previously described.

In operation, the pump 3 operates continuously and this pump is provided with the usual by-pass, if desired, or the fluid can circulate continuously. Fluid under pressure is thus forced into the duct 22 of the valve plug through the pipe 21. The operator rotates the wheel 45, thereby causing the cam 41 to engage one of the valves—for example the valve 14, as shown in Figure 5. The valve is thus pushed upwardly and the intake port 18 is open to the chamber 12. The outlet port 19 is closed by the bottom head 17. The port 25 is open and the fluid under pressure thus exerts a pressure or flows into the duct 24, thence through the pipe 26 pressure is exerted against the piston 34, and the rod 36 will move to the left, as viewed in Figure 1. The piston 35 will now also move to the left, and since the cylinders 32 and 31 are filled with fluid, this movement will be transmitted to the piston 47. This last named piston then moves upwardly in the cylinder 31, and the rack 49, through the gear 50, will rotate the body 6 of the valve in the same direction that the operator previously moved the cam 41. In other words, the valve 14 will be carried off of the cam 41, thus permitting the valve to drop and close the intake port 18, and open the exhaust port 19. The fluid under pressure from the pump 3 will now exhaust through the usual pump by-pass, and further movement of the rod 36 is stopped, which holds the rudder in adjusted position. No further movement occurs until the operator again moves the cam 41 to engage the valves 14 or 15. If the valve 15 is engaged, the pressure fluid flows in the opposite direction, through the pipes 30 and 33 to move the rod 36 towards the right, as viewed in Figure 1. The amount of movement of the rudder to left or right is determined by the distance which the cam 41 moves under a valve 14 or 15. If the cam is carried a considerable distance under a valve, the valve body 6 will have to be rotated a greater amount in order to carry this valve off of the cam. Consequently, the pistons 34 or 35 or 47 will move a greater distance and will, therefore, throw the rudder or lever a greater amount. On extreme movement of the rudder or lever, the piston 47 will move a maximum amount within the cylinder 31, just as the pistons in the ram will move an extreme amount. In order that the wheel 45 shall be centered at all times with the rudder or lever, I provide a valve by-pass means in the piston 47. Due to possible leakage past this piston, of the fluid in the system, or the contraction or expansion of this fluid due to varying temperatures, it is possible that the piston would lag or precede the movement of the pistons in the ram. If this should occur, the piston 47 is moved to extreme position either at the top or bottom of the cylinder 31. One of the valves in the piston will then be open, permitting the pump 3 to force fluid under pressure past the piston 47 and thus move the ram to extreme position. Thus, the system is again completely filled with fluid and the piston 47 will be synchronized with the movement of the ram. This replenishing of the supply of fluid in the lines can occur on either side of the piston 47. While I have disclosed spring valves in the piston 47, it is also possible to use a spring balanced valve, which will open under extreme pressures on either side of the piston 47.

Having described my invention, I claim:

1. A hydraulic remote control comprising a valve body, a plug extending into the valve body, said valve body having a valve chamber therein, a valve in said chamber, said plug having a supply duct therein and an intake port extending from said duct into the valve chamber, said valve chamber having an exhaust port therein, said valve being adapted and arranged to control both the intake and exhaust ports, one of said ports being open while the other is closed, an outlet duct in said plug and a port extending from the last-named outlet duct to the valve chamber, said last-named outlet port being arranged between the inlet port and the exhaust port, means engageable with the valve whereby the valve may be moved longitudinally in the chamber to control said inlet and exhaust ports, and means to rotate the body relative to the last-named means whereby the valve is adjusted.

2. A hydraulic remote control comprising a valve body, a plug extending into the valve body, said valve body having a valve chamber therein, a valve in said chamber, said plug having a supply duct therein and an intake port extending from said duct into the valve chamber, said valve chamber having an exhaust port therein, said valve being adapted and arranged to control both the intake and exhaust ports, one of said ports being open while the other is closed, an outlet duct in said plug and a port extending from the last-named outlet duct to the valve chamber, said last-named outlet port being arranged between the inlet port and the exhaust port, cam means adjacent the valve body, said cam means being engageable with the valve whereby the valve is moved longitudinally in the chamber to control the inlet and exhaust ports, and means to rotate the body relative to the cam means whereby the valve is adjusted.

3. A hydraulic remote control comprising a valve body, said body having a pair of valve chambers therein, a valve in each of said chambers, a plug extending into the valve body, said valve body being rotatable on the plug, said plug having a supply duct and ports extending from said duct into each of the valve chambers, each of the valve chambers having an exhaust port therein, said plug having a pair of outlet ducts therein, and an outlet port extending from each of the outlet ducts to one of the valve chambers, said last-named outlet ports being arranged between the inlet ports and the exhaust ports, and means engageable with either of said valves whereby the inlet and exhaust ports are alternately opened and closed in each of the valve chambers, and means to rotate the body relative to the last-named means whereby either valve is adjusted.

4. A hydraulic remote control comprising a valve body, said body having a pair of valve chambers therein, a valve in each of said chambers, a plug extending into the valve body, said valve body being rotatable on the plug, said plug having a supply duct and ports extending from said duct into each of the valve chambers, each of the valve chambers having an exhaust port therein, said plug having a pair of outlet ducts therein, and an outlet port extending from each of the outlet ducts to one of the valve chambers, said last-named outlet ports being arranged between the inlet ports and the exhaust ports, and manually rotatable cam means engageable with each of said valves whereby the inlet and exhaust ports in said valve chambers are alternately opened and closed, and means to rotate the body relative to the cam means whereby either of the valves is adjusted.

5. A hydraulic remote control comprising a valve body, a plug extending into the valve body, said valve body having a longitudinally extending valve chamber therein, a valve in said chamber and slidable therein, said plug having a supply duct therein and an intake port extending from said duct into the valve chamber, said valve chamber having an exhaust port therein, said valve being adapted and arranged to control both the intake and exhaust ports, one of said ports being open while the other is closed, an outlet duct in said plug and a port extending from the last-named outlet duct to the valve chamber, said last-named outlet port being arranged between the inlet port and the exhaust port, cam means adjacent the valve body, said valve being engageable with the cam means whereby the valve is moved longitudinally in the chamber, means to rotate the valve body relative to the cam means whereby the valve is brought into engagement with the cam means, and means to rotate the cam means relative to the valve body.

OSCAR NEUBERT, Jr.